(12) United States Patent
Evans

(10) Patent No.: US 6,276,572 B1
(45) Date of Patent: Aug. 21, 2001

(54) MEASURING DEVICE WITH CONICAL CAP

(75) Inventor: Christopher T. Evans, Long Valley, NJ (US)

(73) Assignee: Sussex Technology Inc., Sparta, NJ (US)

( * ) Notice: Subject to any disclaimer, the term of this patent is extended or adjusted under 35 U.S.C. 154(b) by 0 days.

(21) Appl. No.: 09/635,546

(22) Filed: Aug. 10, 2000

(51) Int. Cl.$^7$ .................................................. B65D 47/00
(52) U.S. Cl. ..................... 222/476; 222/477; 222/442; 222/424.5; 222/454
(58) Field of Search .................... 222/476, 477, 222/365, 424.5, 425, 442, 453, 454

(56) References Cited

U.S. PATENT DOCUMENTS

| | | | |
|---|---|---|---|
| 1,891,824 | * 12/1932 | Madigan | 222/476 |
| 3,076,581 | * 2/1963 | Booth | 222/453 |
| 3,141,585 | * 7/1964 | Emmert | 222/434 |
| 3,658,216 | * 4/1972 | Schartzman | 222/453 |
| 3,844,454 | * 10/1974 | Buchtel | 222/453 |
| 4,582,230 | * 4/1986 | Vierkotter | 222/442 |
| 4,811,871 | * 3/1989 | Wass et al. | 222/477 |
| 4,830,226 | * 5/1989 | Kong | 222/205 |
| 5,044,527 | 9/1991 | Hickerson | 222/451 |
| 5,092,497 | * 3/1992 | Toedter | 222/434 |
| 5,165,576 | * 11/1992 | Hickerson | 222/158 |
| 5,186,367 | * 2/1993 | Hickerson | 222/207 |
| 5,407,104 | * 4/1995 | Santagiuliana | 222/425 |

FOREIGN PATENT DOCUMENTS

| | | | |
|---|---|---|---|
| 3303562 A1 | * 8/1994 | (DE) | G01F/11/26 |
| 2587798 A1 | * 3/1987 | (FR) | G01F/11/28 |

* cited by examiner

*Primary Examiner*—Kevin Shaver
*Assistant Examiner*—Frederick C Nicolas
(74) *Attorney, Agent, or Firm*—Duane Morris & Heckscher LLP

(57) ABSTRACT

A device for assisting in the dispensing of a product (liquid or solid) comprising a shaft having a substantially hollow passage therein, a first cone-shaped cap disposed on a first end of the shaft, a second cap disposed on a second end of the shaft, said second cap having an opening therein which is substantially aligned with the hollow passage, and, a spider guide disposed between the second cap and the shaft, wherein the shaft has at least one hole therein disposed at a position closer to the first end of the shaft than the second end of the shaft. The device is preferably inserted into a container which holds product to be dispensed. The device provide a venting and dispensing controlling system whereby defined quantities of product can be dispensed from the container quickly and efficiently. The first cone-shaped cap allows the device to be inserted into containers with smaller necks, while still maintaining a large dose amount.

21 Claims, 1 Drawing Sheet

MEASURING DEVICE WITH CONICAL CAP

FIELD OF THE INVENTION

The present invention relates to devices for dispensing products (liquids and granular solids), and in particular, devices for dispensing predetermined quantities of products from a container.

DESCRIPTION OF THE RELATED ART

Products such as liquid detergents, soaps, bleaches, and fabric softeners are currently being sold in containers which require the user to determine the amount of liquid needed for a specific end use of the product. Some of these containers have caps which may also serve as measuring cups to assist the user in pouring out a desired quantity of the product. Hopefully, the user keeps the measuring cup close at hand after the product has been opened, such as when detergents are used in laundry rooms.

Instructions on the containers provide the user with helpful information in determining the correct, or optimum amount of liquid bleach, for example, to use for the intended size of the laundry load, types of clothes being cleaned, and particular fabrics. Other liquids, such as mouthwash and medicinal liquids, are also preferably dispensed with precision and accuracy.

It has been learned, however, in a survey of users of such liquids, that most people merely pour out an estimated amount of the liquid based primarily on their own judgment and experience, or lack thereof. Very few users bother to take the time to measure the precise quantity, either with or without the measuring cap, because doing so requires extra time and two hands. As a result, the quantity of product varies greatly from individual to individual, even though a precise dose is required. This happens in spite of the known fact that using too much or too little of the product will affect the success of the job, whether it is cleaning, freshening breath, dispensing cough syrup, or whatever. Obviously, too much product is wasteful and expensive, and in the case of medicines, may be dangerous.

It is generally recognized by bottle and cap manufacturers that a container dispensing system which is capable of providing an accurate measure quantity of product is highly desirable.

U.S. Pat. No. 5,044,527 to Hickerson discloses a liquid dispensing system for dispensing a predetermined quantity of liquid. The system includes a container 10 with a restricted throat 29. The container 10 has disposed therein a valve spool 17 for controlling the quantity of liquid which flows from the container. The valve spool 17 includes an elongated stem 19, a valve means 25, a piston 21, and a spider guide 23. The piston 21 includes a vent 27 which allows air to flow back into the container 10 to assist in the dispensing process. The valve spool 17 fits into the restricted throat 29 of the container 10, as shown in FIG. 2 of the patent. As shown in FIGS. 6 and 7 of the patent, when the container 10 is inverted, liquid inside the container fills a top chamber 13 of the container until valve means 25 (of the valve spool 17) seals the top chamber from the remainder of the container (FIG. 7). Thus, liquid present in the container can be dispensed in predetermined amounts.

A problem associated with the above dispensing system is that it often times does not dispense liquid evenly due to inefficiencies of the venting system (e.g., vent 27 on the valve spool 17). For example, the liquid will sometimes be dispensed in "clumps" or uneven amounts due to the irregular airflow through the vent 27 and into the container 10. Additionally, the vent 27 often causes inaccuracies between pours based on the orientation and speed of the pour, and also allows some fluid to pass out through the vent (thereby decreasing the accuracy of the amount of liquid poured).

Thus, there is currently a need for an improved venting system for product (liquid or granular solid) dispensing systems which dispenses predetermined quantities of the product in precise amounts.

SUMMARY OF THE INVENTION

The present invention is a device for assisting in the dispensing of a product comprising: a shaft having a substantially hollow passage therein, a first cone-shaped cap disposed on a first end of the shaft, a second cap disposed on a second end of the shaft, said second cap having an opening therein which is substantially aligned with the hollow passage and, a spider guide disposed between the second cap and the shaft, wherein the shaft has at least one hole therein disposed at a position closer to the first end of the shaft than the second end of the shaft.

The above and other advantages and features of the present invention will be better understood from the following detailed description of the preferred embodiments of the invention which is provided in connection with the accompanying drawings.

DETAILED DESCRIPTION

Figure 1:
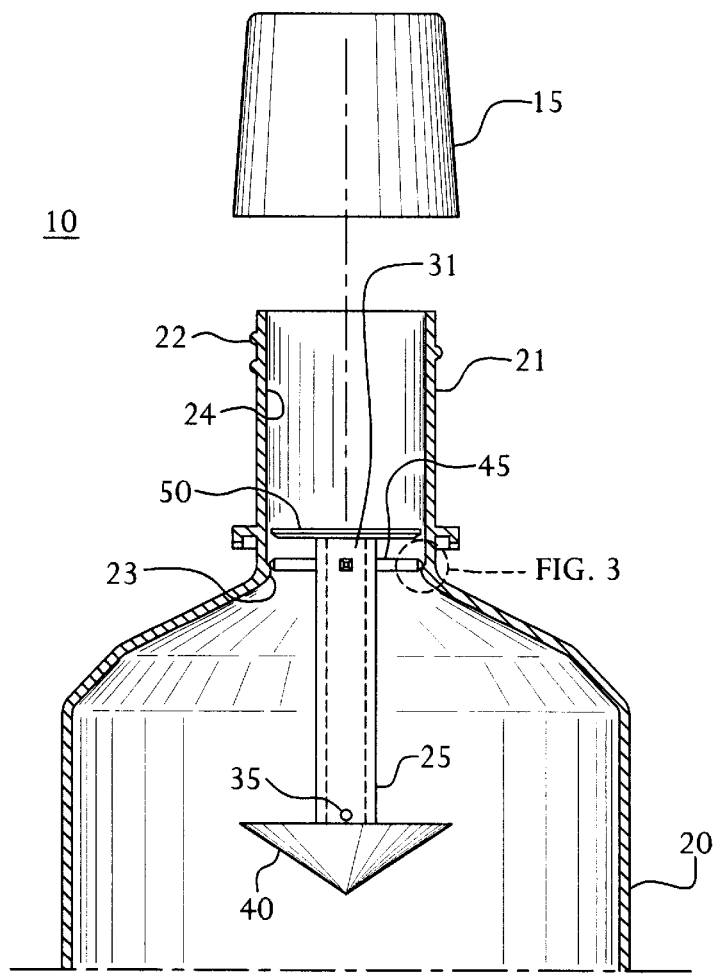
FIG. 1 is partial cross-section view of a product dispensing system according to a first exemplary embodiment of the present invention.

Referring to FIG. 1, there is shown a product dispensing system 10 according to a first exemplary embodiment of the present invention. The system 10 includes a container 20 with a cap 15, and a valve device 25 disposed inside the container. The container 20 includes a neck 21 with an inner surface 24 and an outer threaded surface 22.

Figure 2:
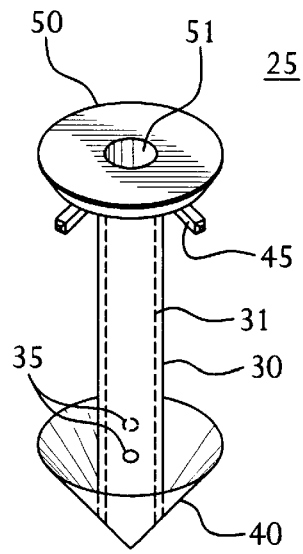
FIG. 2 is an isometric view of a valve device according to a first exemplary embodiment of the present invention.
Figure 3:
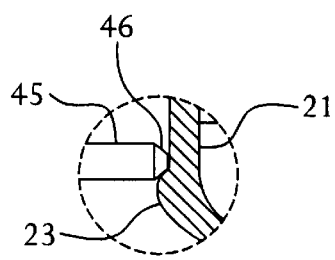
FIG. 3 is an enlarged view of a container throat shown in FIG. 1.

As shown more particularly in FIGS. 1–3, the valve device 25 includes several portions. The bulk of the valve device 25 is a shaft 30 which includes a hollow passage 31 on the interior thereof. A first valve cap 40 is coupled to a first end of the shaft 30, and a second valve cap 50 is coupled to a second end of the shaft.

The first valve cap 40 is preferably cone-shaped and made of a flexible material (e.g., flexible plastic) so that the valve device may be easily inserted into the container 20, as explained below. In order to provide flexibility, the first valve cap 40 is preferably made of a very thin plastic member (e.g., 0.025 inches thick or less). The first valve cap 40 also preferably has a diameter at least twice the diameter of the shaft 30. This feature allows the valve device 25 to be utilized with containers (e.g. container 20) of different neck (e.g., neck 21) sizes while still allowing significant product flow. Additionally, the diameter of the first valve cap 40 is preferably made wider than the diameter of the container throat 23, so that once the valve device 25 has been inserted in the container 20, it cannot be removed without applying significant force to the valve device in an upwards direction (i.e., away from the container 20).

The conical shape of the first valve cap 40 is particularly important in that it allows the valve device 25 to be inserted into containers (e.g., container 20) with smaller neck sizes while still permitting large dosage sizes. In particular, the diameter of the first valve cap 40 is made larger than the diameter of the container throat 23 (and consequently larger than the diameter of the second valve cap 50). Additionally, the first valve cap 40 is preferably made of a thin flexible material. Accordingly, when the valve device 25 is inserted into a container (e.g., container 20), the first valve cap 40 will bend inwardly to the size of the container neck 21, and will subsequently expand back to its original shape once it passes the container throat 23. This allows the valve device 25 to be inserted in containers with smaller necks, while still maintaining a large dosage amount (because, as explained below, the diameter of the first valve cap 40 in part determines a "dose amount").

The second valve cap 50 preferably includes a central hole 51 which is substantially aligned with the hollow passage 31 in the shaft 30. The diameter of the second valve cap 50 is preferably less than the diameter of the container neck 21, so that the valve device 25 may move within the container neck. The valve device 25 also includes a spider guide 45 which is preferably approximately the same diameter as the container throat 23, so that an outer surface 46 of the spider guide rests on the container throat (see FIG. 3) when the container 20 is in its fully upright position (as shown in FIG. 1).

The spider guide 45 is preferably dimensioned so as to center the valve device 25 within the container neck 21. The spider guide 45 preferably comprises an X-shaped member which extends from shaft 30, however, the spider guide may take any suitable shape known to those skilled in the art.

The valve device 25 is preferably inserted in the container 20 by placing the valve device in the container neck 21 and applying a downward force on the valve device so that the first valve cap 40 is forced through the throat 23 of the container. Then, the valve device 25 falls down in the container neck 21 until the spider guide 45 rests on the throat 23 of the container 20.

In operation, the product dispensing system 10 provides for the dispensing of controlled amounts of product (liquid or solid). The dispensing process is begun by removing the cap 15 from the container 20 and inverting the container. As the container is inverted, the valve device 25 begins to move forward in the container neck 21, and product in the container 20 begins to flow into the container neck towards a container dispensing opening (i.e., the mouth of the container 20). Additionally, in the case of a liquid product, air bubbles form in the product due to the flow of air through the valve device 25. It should be noted that as the container 20 is inverted, air flows into the valve device 25 through inlet central hole 51, and out into the product (as bubbles, if liquid product) through one or more outlet vent holes 35 (disposed on either side of the shaft 30). As the container 20 becomes more and more inverted, the valve device 25 continues to move forward in the container neck 21, as does the product. As soon as the second valve cap 50 passes across the container dispensing opening, product begins to flow from the container. At approximately the same time that valve cap 50 is passing across a container dispensing opening (i.e., the mouth of the container 20), the first valve cap 40 becomes seated in the container throat 23, thereby preventing product in the container 20 from continuing to flow into the container neck 21. The product trapped in the container neck 21 is thus dispensed through the container dispensing opening in a predetermined amount. Product is dispensed from a gap between the container dispensing opening and the second valve cap 50. During this process, air flows into the container neck 21 at an upper side thereof (causing bubbles to form), while fluid is dispensed from a lower side.

The selection of the size of inlet central hole 51, outlet vent hole 35, and hollow passage 31 are preferably based on the viscosity (e.g., liquid) or density (e.g., granular solid) of the product to be dispensed and the relative speed with which the product is to be dispensed. The volume or dose amount of a particular product is determined by the distance between the first and second valve caps 40, 50, as well as the particular diameter of the valve caps and the diameter of the shaft 30. Additionally, it may be possible to increase or decrease the dose amount by altering the size and shape of the holes 35 and 51, and thus rate of dispensing. Further, it should be noted that additional vent holes 35, 51 may be added to the shaft 30 to change the dosing parameters (e.g., increase/decrease the dose amount and/or the pour speed).

The product dispensing system 10 according to the first exemplary embodiment of the present invention provides for a more accurate and efficient method of dispensing product because of the improved venting system (i.e., shaft 30, inlet central hole 51, and outlet vent holes 35) of the valve devices 25. The hollow passage 31 in the shaft 30 allows air to flow into the product at a controlled rate, thereby making the transition of the valve device 25 much smoother and more accurate than in prior art dispensing systems (e.g., U.S. Pat. No. 5,044,027 described above).

The valve device 25 described above are preferably made of plastic by, for example, extrusion or injection molding methods which are well known in the art. Preferably, the above-described shaft 30, first cap 40, second cap 50 and the spider guide 45 are formed as a unitary piece by extrusion. Further, it should be noted that the shaft 30 and hollow passage 31 may be formed of any suitable diameters, and that such diameters may be altered to alter the amount of fluid dispensed and fluid flow rate.

Although the invention has been described in terms of exemplary embodiments, it is not limited thereto. Rather, the appended claims should be construed broadly, to include other variants and embodiments of the invention which may be made by those skilled in the art without departing from the scope and range of equivalents of the invention.

What is claimed is:

1. A device for assisting in the dispensing of product comprising:

a shaft having a substantially hollow passage therein;

a first cone-shaped cap disposed on a first end of the shaft;

a second cap disposed on a second end of the shaft, said second cap having an opening therein which is substantially aligned with the hollow passage; and, a spider guide disposed between the second cap and the shaft, wherein the shaft has at least one hole therein disposed at a position closer to the first end of the shaft than the second end of the shaft.

2. The device of claim 1, wherein the second cap is made of a flexible material.

3. The device of claim 1, wherein the opening in the second cap allows air to flow into the hollow passage of the shaft and out of the at least one hole formed in the shaft.

4. The device of claim 1, wherein the second cap comprises a disc-shaped member which has a diameter at least twice that of a diameter of the shaft.

5. The device of claim 1, wherein the spider guide comprises an X-shaped member which extends from the shaft.

6. The device of claim 1, wherein the at least one hole comprises at least two holes disposed on opposing sides of the shaft.

7. The device of claim 1, wherein the shaft, the first cap, the second cap and the spider guide are formed as a unitary piece by an extrusion process.

8. The device of claim 1, wherein the shaft, the first cap, the second cap and the spider guide are formed as a unitary piece by an injection molding process.

9. The device of claim 1, wherein the at least one hole extends through a wall of the shaft, from the hollow passage to an outer surface of the shaft.

10. The device of claim 1, wherein the at least one hole is substantially circular.

11. The device of claim 1, wherein the first cap is fixedly attached to the first end of the shaft.

12. The device of claim 1, wherein the diameter of the at least one hole is approximately one-third of the diameter of the opening.

13. The device of claim 1, wherein a diameter of the first cap is greater than a diameter of the second cap.

14. The device of claim 1, wherein the first cap is made of a flexible material.

15. The device of claim 1, wherein the first cap increases a dose amount of a product dispensed from the device.

16. The device of claim 1, wherein the product comprises a liquid product.

17. An apparatus for dispensing a product comprising:

a container; and, a device for assisting in the dispensing of a product from the container comprising a shaft having a substantially hollow passage therein, a first cone-shaped cap disposed on a first end of the shaft, a second cap disposed on a second end of the shaft, said second cap having an opening therein which is substantially aligned with the hollow passage, and, a spider guide disposed between the second cap and the shaft, wherein the shaft has at least one hole therein disposed at a position closer to the first end of the shaft than the second end of the shaft.

18. The apparatus of claim 17, wherein at least one portion of the spider guide rests on a throat of the container when the device is disposed within the container.

19. The apparatus of claim 17, wherein a diameter of the first cap is made greater than a diameter of a neck of the container.

20. The apparatus of claim 17, wherein the first cap is made of a flexible material.

21. The apparatus of claim 17, wherein the product comprises a liquid product.

* * * * *